United States Patent [19]

Gaigg

[11] 4,007,346
[45] Feb. 8, 1977

[54] ENCAPSULATED SWITCHING INSTALLATION

[75] Inventor: Wilhelm Gaigg, Oberentfelden, Switzerland

[73] Assignee: Sprecher & Schuh AG, Aarau, Switzerland

[22] Filed: Oct. 10, 1974

[21] Appl. No.: 514,032

[30] Foreign Application Priority Data

Nov. 27, 1973 Switzerland ............... 16648/73

[52] U.S. Cl. .................. 200/148 R; 200/145; 200/148 B
[51] Int. Cl.² ........................... H01H 33/54
[58] Field of Search ............ 200/148 R, 145, 148 B

[56] References Cited

UNITED STATES PATENTS

| | | | |
|---|---|---|---|
| 3,007,021 | 10/1961 | Prunty et al. | 200/148 R |
| 3,691,332 | 9/1972 | Sharp | 200/145 X |

*Primary Examiner*—Robert S. Macon
*Attorney, Agent, or Firm*—Haseltine, Lake & Waters

[57] ABSTRACT

Encapsulated switching installation with a substantially cylindrical tank which is insulatingly sealed at both ends and a switching device accommodated within the tank, which by means of contacts can be connected to the conductor of throughpassages secured to the tank and actuated by a drive mechanism located externally of the tank. The switching device consists of a switch element or two switch elements arranged in series and each switch element of the switching device is mechanically fixedly connected into a structural unit with a cover forming a removable tank closure, which can be inserted into the tank in the direction of movement occurring along the lengthwise axis of the tank and can be removed from the tank, and the connection contacts of the switch mechanism are plug connections which upon insertion of the structural unit or units into the tank close and upon removal thereof out of the tank open, and that for moving the structural unit or units there is provided a traveling mounting device with a support frame secured at the tank cover of the structural unit to be moved.

8 Claims, 7 Drawing Figures

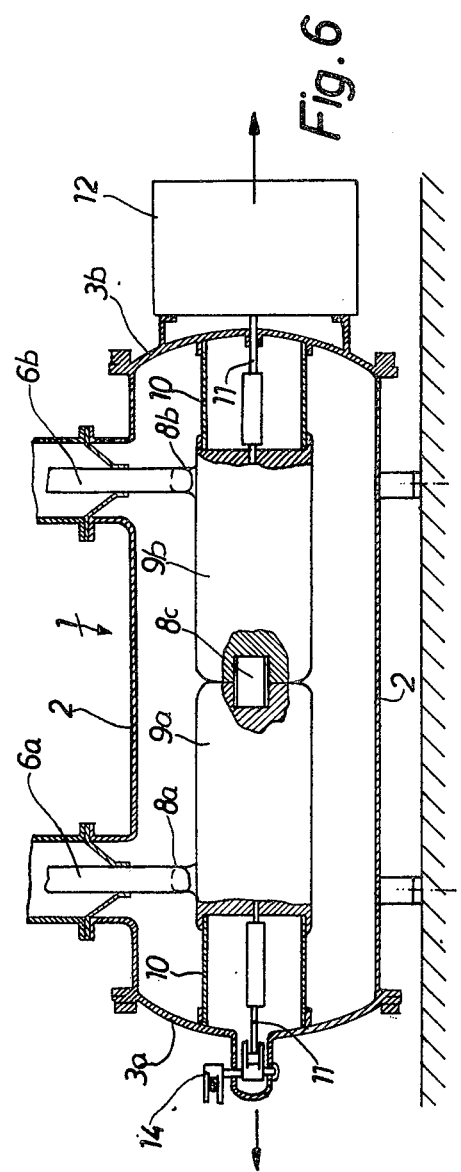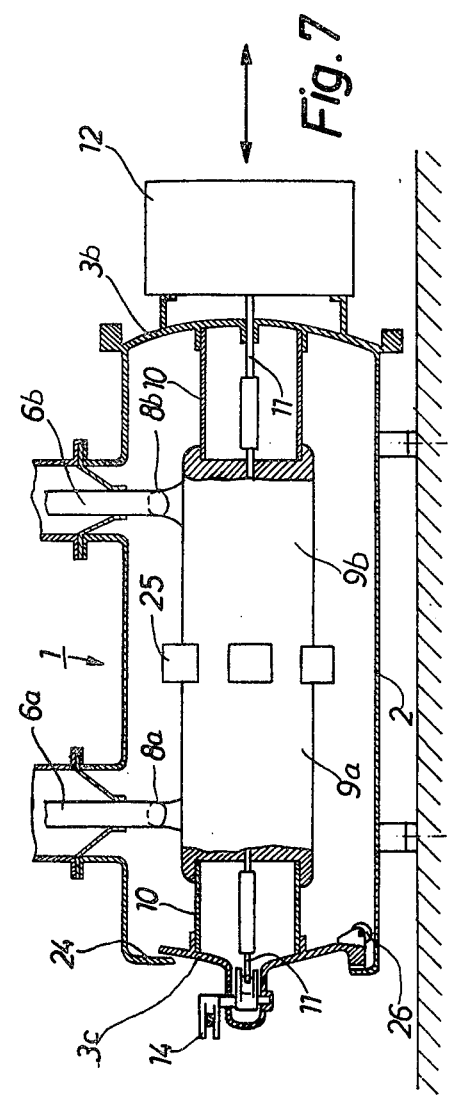

ENCAPSULATED SWITCHING INSTALLATION

BACKGROUND OF THE INVENTION

The present invention relates to an improved encapsulated or encased switching installation with a substantially cylindrical tank which is insulatingly sealingly closed at both ends and a switching mechanism or device accommodated within the tank which by means of contacts can be connected to the conductor of throughpassages secured to the tank and actuated by a drive mechanism located externally of the tank.

Encapsulated switching installations are rather voluminous and their weight is considerable. Viewed from the economic side there exists on the one hand the requirement for as compact as possible structure and a minimum space requirement and, on the other hand, for operating technical reasons the required revision work should be easy and rapid and also the exchange of entire poles should be capable of being carried in the shortest possible time.

In order to be able to carry out the revision work previously there were provided in the casing revision openings, by means of which the interior of the tank was accessible. Such switching installations do not correspond to the imposed requirements since, especially, the space requirement is large and the exchange of entire poles is time consuming. Other known switching installations of this type which are improved constructions are designed such that for the revision it is possible to exchange the entire pole including the casing or encapsulation.

Since the weight of the pole and encapsulation or casing is considerable there are required for their movement cranes or expensive special devices and complicated support constructions are required for the switching installations since the switching installation cannot be installed on the switching housing. The improvements are therefore attained by taking into account not inconsiderable economical drawbacks.

SUMMARY OF THE INVENTION

It is a primary object of the present invention to provide an improved encapsulated switching installation wherein there is attained a small space requirement and an easy carrying out of the revision work as well as a rapid exchange of entire poles without any great expenditure.

Now in order to implement this and still further objects of the invention, which will become more readily apparent as the description proceeds, the switching device or mechanism of this development consists of a switch element or two switch elements arranged in series and that each switch element of the switching mechanism is mechanically fixedly connected into a structural unit with a removable cover forming a tank closure, the structural unit can be inserted into the tank by carrying out a movement in the direction of the lengthwise axis of the tank and can be removed from the tank, and the connection contacts of the switching mechanism are constituted by plug connections which upon insertion of the structural unit or units into the tank close upon removal thereof out of the tank open, and for the movement of the structural unit or units there is provided a traveling mounting device with a support frame which can be attached at the tank cover of the structural unit to be moved. Since substantially only the switching element is moved with the cover the mounting device, which preferably can be constructed in the form of a "revision car or wagon", owing to the relatively slight weight which is to be transported can be of simpler construction and for the removal of a structural unit there is only required little time, since only the cover must be secured to the support frame of the revision car which has been moved into place and the attachment of the cover at the tank can be released. After the removal the switching element is free and the interior of the tank is accessible by the opening which has been freed because of the removal of the cover, wherein because of the removed switching element there is sufficient place in the tank for the revision work.

At the inside of a tank cover which is secured at a tank external flange there can be insulatingly attached with respect to ground a switching element by means of an insulation support and the drive rod of the switching element can be extended through the cover wherein with polewise drive the drive mechanism can be mounted externally at the cover and together with the same and the switching element can form a structural unit and in the case of a three-pole drive the end of the drive rod which protrudes out of the cover can carry a coupling portion.

The switching installation can exhibit a switching mechanism consisting only of one such switching element, wherein then the insertion and removal of the switching element occurs by means of a movement of the structural unit occurring from the end of the tank. In the case of a switching element with a switching mechanism consisting of two series connected elements it is possible for each switch element to be secured to the inside of a cover which can be mounted at a tank external flange and together therewith forms a structural unit, wherein the one structural unit from the one end of the tank and the other structural unit from the other end of the tank can be inserted and removed and both switching elements can be coupled together by means of a plug connection. Instead of this arrangement it is also possible for the one switching element to be secured to a tank cover which can be mounted at an outer flange of the tank and the other switching element at the inside of a tank cover which can be arranged in the tank and placed at the inside of a tank inner flange, wherein both switching elements can be mechanically connected with one another in order to collectively form with the covers connected therewith a combined structural unit which can be inserted into and removed from the tank by axial movement of the tank outside cover. Of the combined structural unit the structural unit encompassing the tank inner cover and the switching element secured thereat can be supported at the tank inner wall by rollers arranged at the field-dead zone. For the further facilitation of the work the movement of the structural units can occur during the traveling of the mounting device during the erection and separation of the switching mechanism connections through the plug connections via an auxiliary mechanism.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 6 is a tank with two switching elements connected in series of a first embodiment; and FIG. 7 illustrates a tank with two switching elements connected in series of a further embodiment.

DETAILED DESCRIPTION OF THE PREFERRED EMBODIMENTS

Figure 1:
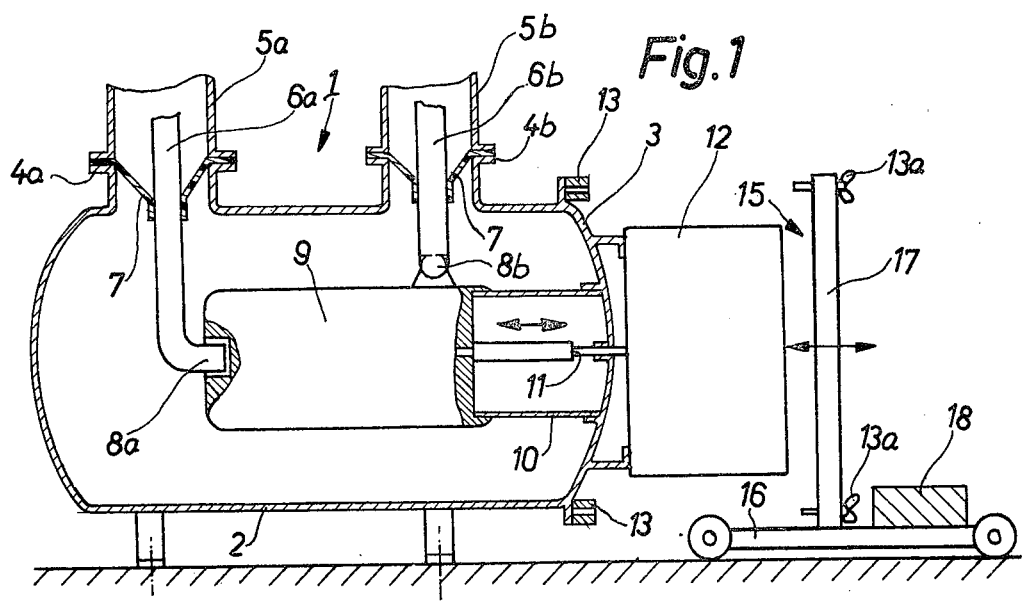
FIG. 1 is a schematic illustration of a switching installation tank with power switch and drive and a revision car or wagon somewhat removed therefrom.
Figure 2:
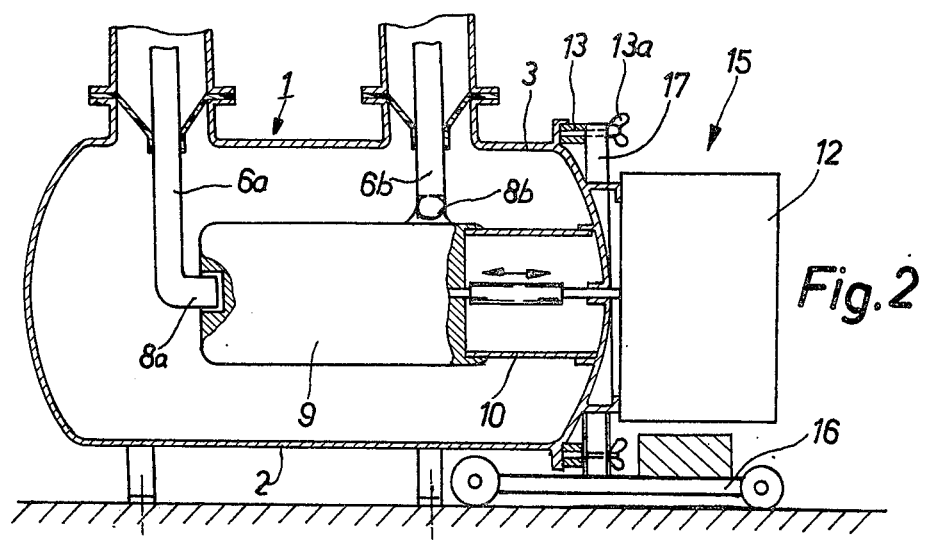
FIG. 2 illustrates the tank and car of FIG. 1 in the mounting and demounting position respectively.
Figure 3:
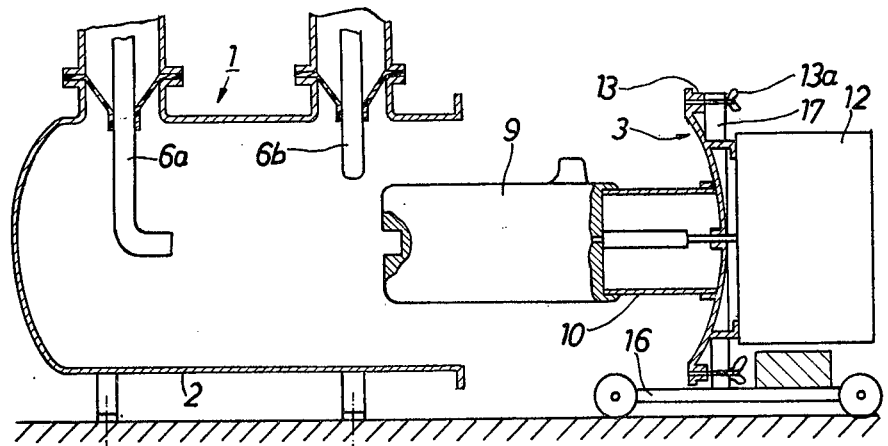
FIG. 3 illustrates the tank and car of FIG. 1 with the moved-out or removed power switch.

Describing now the drawings, the sectionally horizontally schematically illustrated switching installation tank 1 portrayed in FIG. 1 is, as usual, constructed in the form of a hollow cylinder 2 closed at one end, which is closed by a cover 3 flanged at the other end so as to be insulating medium tight. The switching installation tank 1 is stationarily mounted. The tank cylinder 2 carries at the top two flanges 4a, 4b at which there are secured the throughpassages or access openings 5a, 5b. At the conductors 6a, 6b held by the conical support insulators 7 there is connected, in the illustrated exemplary embodiment, a two-pole power switch 9 which is driven by a drive 12 arranged externally of the tank 1. To this extent the illustrated switching installation tank corresponds to known constructions. In contrast thereto here however there are also connected power switch 9 and drive 12 at the tank cover 3. The power switch 9 is secured so as to be freely supported by means of a cylindrical insulating carrier or support 10 at the cover inside and the drive 12 is located at the outside of the cover 3 and is connected with the active switching components by means of an insulating rod 11. Cover 3, power switch 9 and switch drive 12 are grouped together into a structural unit such that after releasing of the cover screws they can be removed as a unit from the tank 1. The connections of the power switch 9 with the conductors 6a, 6b are in the form of plug contacts 8a, 8b with the fixed contact elements at the conductor end and the movable contact element at the switch 9 constructed such that during axial removal of the cover 3 the connections can be released or interrupted and upon axial mounting of the cover 3 upon the tank the connections can be again established. For such plug connections there are known to the art different constructionally simple and worthy structures. For handling the structural units consisting of the cover, switch and switch drive and having a considerable weight there is provided a traveling auxiliary aid in the form of a "revision car or wagon" 15, at which there is mounted a support frame 17 at a traveling mechanism 16 carrying a counter weight 18, wherein the traveling mechanism 16 and the support frame 17 are constructed such that with the revision car 15 moved up to the tank 1 the support frame 17 bears against the cover flange (FIG. 2). The cover flange is equipped with a number of brackets 13 arranged between the cover screws and the support frame 17 contains at the relevant locations threaded bolts 13a by means of which the support frame 17 of the revision car 15 can be threaded to the cover 3. After releasing of the cover screws the revision car 15 together with the cover 3 and the power switch 9 secured thereat as well as the drive 12 can be moved away in axial direction from the tank, wherein the plug contact connections 8a, 8b can be released and, when the revision car or wagon 15 has been moved far enough away (FIG. 3), the power switch is free for the revision work and the interior of the tank is freely accessible. After carrying out the revision work, the same power switch, or in the case of greater damage with longer time for repairs, there can be introduced a new power switch into the tank.

After threading the cover 3 at the tank then it is possible for the threaded bolts 13a to be released at the support frame 17 and the revision car or wagon can be moved away.

Figure 4:
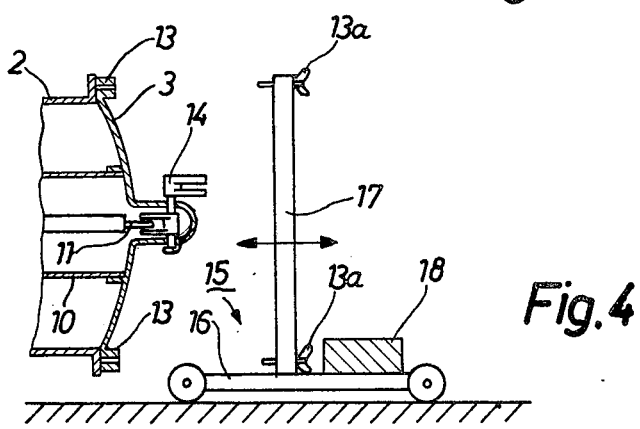
FIG. 4 is a tank cover with an arrangement for the three-pole coupling of the switch and revision car.

In an installation for three-pole coupling of the switch the drive 12 is preferably not secured to the tank cover 3, rather arranged above or laterally of the three-pole switch. As best seen by referring to FIG. 4, in such case the tank cover 3 then carries at its outside only a coupling portion 14. For revision initially the coupling of the pole is released and then the revision car 15 is moved towards the tank cover 3.

It is apparent that the release of the plug connection upon removal of the switch and the establishment of the plug connection upon insertion of the switch requires rather careful work in order that no parts are damaged. In order to facilitate the same there is advantageously provided an auxiliary mechanism.

Figure 5:
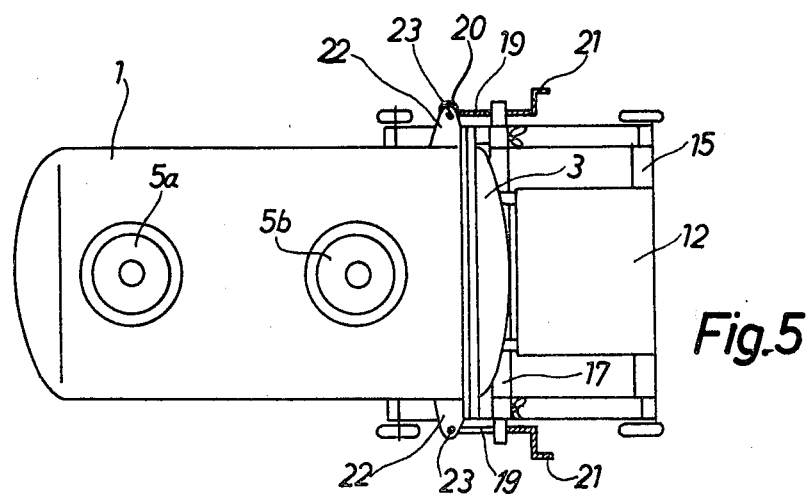
FIG. 5 is a front view of a tank with the revision car moved into position and in an exemplary arrangement an auxiliary mechanism for facilitating removal of the switch out of the plug contact.

FIG. 5 illustrates as an exemplary embodiment an easy to handle, simple and robust auxiliary mechanism, which is predicated upon the features that the revision car when retracted to the first portion of its path and when inserted to the last portion of its path is not moved by the carriage drive, rather by an exactly controllable auxiliary drive. The support frame 17 of the revision car or wagon 15 carries at two locations disposed opposite one another and within one another a respective threaded rod 19 which are parallel to the tank axis, and which are provided at the ends with a rotatable eyelet 20 and can be turned by means of a drive mechanism, for instance a hand crank 21 at the other end. The cylindrical tank portion 2 possesses at the corresponding locations at the flange a respective bracket 22. During removal initially the revision car 15 is moved to a position up to the tank until it bears by means of its support frame 17 at the cover flange at the tank. Then by rotating the cranks 21 the eyelets 20 of the threaded rods 19 are aligned with the tank flanges 22 and connected by bolts 23 therewith. After the threading of the cover at the support frame 17 and release of the cover screws the threaded rods 19 together with the drive mechanism, in this case the cranks 21, are rotated out simultaneously and uniformly of the support frame 17, so that the revision car can be carefully pushed away from the tank and the switch contacts 8a, 8b, can be separated without effort with the necessary care. Then when the car has been pushed away to such an extent that the switch contacts are separated the bolts 23 are removed and the switch with the revision car propelled now with its own drive completely moved out of the tank. Upon rebuilding of the switch one proceeds analogously in the reverse direction of the individual steps. Advantageously the threaded rods 19 are equipped with a common drive mechanism, such as for instance sprocket gear and chain or rotating shaft with bevelled gears, so that the drive can only occur from one location. Apparently for such auxiliary mechanism there can be selected also other constructions. Thus, for instance, also toggle systems, combinations of brackets and rollers and the like can be used.

FIGS. 6 and 7 show two exemplary variants of an encapsulated or cased switching installation in which in a tank 1 there are provided two switch elements 9a, 9b arranged in series.

The tank 1 shown in FIG. 6 is closed in an insulating medium tight manner at both ends by a respective flanged cover 3a, 3b. At the inside of the one as well as the other cover 3a, 3b, as previously described, there is secured by means of an insulating support 10 a switching element 9a and 9b respectively, of which each is connected by means of a plug contact 8a and 8b respectively at a throughpassage conductor 6a and 6b respectively. Both of the switch elements 9a, 9b are connected with one another by a plug connection 8c and their mechanical coupling occurs preferably by means of a connection rod externally of the casing, since the coupling rod does not impair the dielectric strength of the switch and then the switch housing can be simply constructed. The insertion and removal of both switching or switch elements 9a, 9b occurs with this exemplary variant, as apparent, at both sides or ends of the tank 1, and specifically for each switch element in such a manner as such has been described in conjunction with the previously mentioned Figures. This both side servicing required during a revision of the switching installation can be of a hinderance in a number of instances and can lead to undesired long working times.

FIG. 7 illustrates an exemplary embodiment with two switching elements 9a, 9b arranged in series, both of which only can be driven into and driven out of the tank from one side of the tank into the tank. The one tank cover 3b, like the previously described embodiments, is flanged externally at the cylindrical tank portion 2 and carries by means of the insulation support 10 the one switching element 9b and for instance a switch drive 12. At the other end the cylindrical tank portion 2 possesses an internal flange 24 at which bears the other tank cover 3c from the inside in an insulating medium tight fashion, wherein the threading of the tank cover 3c and the internal flange 24 occurs from the outside. At this cover 3c located in the tank there is secured by means of the insulating carrier or support 10 a switch element 9a and at its outside for instance the coupling portion 14. Both of the switch elements 9a, 9b are fixedly connected with one another for instance by threads or screws 25. After the release of the cover threading at the inner flange 24 it is possible to remove from the side of the outer cover 3b with the aid of the revision care the entire structural unit out of the tank 1 and which consists of the external or out cover 3b, both of the switch elements 9a, 9b and the inner cover 3c. Owing to the length of such structural unit and the rather large weight of the switch elements there is provided for the switch element 9a in the field-dead zone a support at wheels or rollers, by means of which there is considerably facilitated the introduction and removal of the structural unit.

While there is shown and described present preferred embodiments of the invention, it is to be distinctly understood that the invention is not limited thereto, but may be otherwise variously embodied and practiced within the scope of the following claims.

What is claimed is:

1. An encapsulated switching installation with a substantially cylindrical tank closed tight with insulating medium at both ends and a switching device in the tank and having contacts connectable to a conductor of through-passages secured at the tank and can be actuated by a drive mechanism located externally of the tank, the improvement comprising a switching device having at least one switch element mechanically fixedly connected to a structural unit with a removable cover forming a tank closure, the structural unit being insertable into a tank by movement in direction of the longitudinal axis of the tank and being removable out of the tank, the connection contacts of the switching device comprising plug connections which upon insertion of the structural unit into the tank close and upon removal of the structural unit out of the tank open, and a traveling mounting device with a support frame secured to the tank cover of the structural unit to be removed, for the movement of the structural unit, at a tank cover secured at the inside of a tank external flange there is connected insulatingly with respect to ground a two- or three-pole switch element by means of an insulating support, said switch element having a drive rod piercingly extending through the cover, the drive mechanism with a polewise driven switch element being mounted externally at the cover and together therewith, the switch element forming a structural unit, the end of the drive rod with a three pole driven switch element protruding from the cover and carrying a coupling portion.

2. The switching installation as defined in claim 1, wherein the switch device comprises a polewise three-pole driven switch element.

3. The switching installation as defined in claim 1, wherein the switching device comprises two switch elements arranged in series, each switch element being secured at the inside of a cover which can be placed at a tank external flange and together therewith forms a structural unit, the one structural unit from the one end of the tank and the other structural unit from the other end of the tank being movable in and out, and, a plug connection for coupling both switch elements to one another.

4. The switching installation as defined in claim 1, wherein the switching device comprises two series connected switch elements, one switch element being arranged at a tank cover which can be placed against an outer flange of the tank and the other switch element is arranged at the inside of a tank cover which is arranged in the tank and can be placed at the inside of a tank inner flange, both switch elements being mechanically connected with one another and forming together with the cover secured thereto a combined structural unit which can be inserted into and removed from the tank by axial movement of the tank outside cover.

5. The switching installation as defined in claim 4 including tank rollers for supporting the structural unit encompassing the tank inside cover and the switch element secured thereat the inner wall of the tank, said rollers being arranged in a fielddead zone.

6. The switching installation as defined in claim 1, wherein the movement of the structural unit by the traveling mounting device during the establishment and separation of switching device connections occurs by plug connections through auxiliary means.

7. A gas-insulated circuit breaker comprising, in combination: an elongated cylindrical grounded housing; first and second spaced bus terminals extending into said grounded housing and being insulated from said grounded housing; first and second end closures for closing and sealing the ends of said grounded housing; clamping means for removably clamping said first end closure to said grounded housing; a circuit interrupter positioned within said grounded housing and having first and second contact means which are engageable and disengageable with respect to said first and second spaced bus terminals respectively; support means for connecting said circuit interrupter to the interior of said first end closure and constituting a primary support for supporting said circuit interrupter within said grounded housing; and truck connection means on the exterior of said first end closure for enabling the connection of a truck thereto and the withdrawal of said first end closure and said circuit interrupter from said grounded housing; means for operating said circuit interrupter; said operating mechanism means being fixed to the said exterior of said first end closure and including an operating rod extending through said first end closure and to said circuit interrupter, said first and second bus terminals being spaced from one another along the axis of said grounded housing and are slidably engaged and disengaged by said first and second contact means, respectively; auxiliary force-producing means connected between said first end closure and said grounded housing for applying axially-directed forces therebetween at least during the engagement and disengagement of said first and second contact means and said first and second spaced bus terminals, respectively; auxiliary support means extending from said circuit interrupter at a point thereof removed from said first end closure to the bottom of said grounded housing, thereby to assist in the support of said circuit interrupter when said circuit interrupter is being withdrawn from said housing; a further truck device; said truck device being connectable to said first end closure and being movable toward and away from said grounded housing, and supporting said circuit interrupter as said circuit interrupter is withdrawn from the interior of said grounded housing as said truck device is moved away from said grounded housing; said truck device has a counterbalancing weight thereon to prevent the tipping over of said truck device due to the suspended weight of said circuit interrupter.

8. The apparatus of claim 7 including a second circuit interrupter interposed between one end of said circuit interrupter and said first bus terminal; and first and second contact means on said second circuit interrupter which are engageable and disengageable with respect to said first bus terminal and said first contact means of said circuit interrupter, respectively; and second support means connecting said second circuit interrupter to the interior of said second end closure and constituting a primary support for supporting said second circuit interrupter within said grounded housing; and truck connection means on the exterior of said second end closure for enabling the connection of a truck thereto and the withdrawal of said second end closure and said second circuit interrupter from said grounded housing; first and second operating mechanism means for operating said circuit interrupter and said second circuit interrupter, respectively; said first and second operating mechanism means being fixed to the exteriors of said first and second end closures, respectively.

* * * * *